US007360123B1

(12) United States Patent
Westenberg et al.

(10) Patent No.: US 7,360,123 B1
(45) Date of Patent: Apr. 15, 2008

(54) CONVEYING CAUSAL RELATIONSHIPS BETWEEN AT LEAST THREE DIMENSIONS OF RECOVERY MANAGEMENT

(75) Inventors: Guido Westenberg, Minneapolis, MN (US); Branka Rakic, Maple Grove, MN (US); Steven Kappel, Savage, MN (US); Shelley A. Schmokel, Prior Lake, MN (US); Julianne M. Urban, Stillwater, MN (US)

(73) Assignee: Symantec Operating Corporation, Mountain View, CA (US)

( * ) Notice: Subject to any disclaimer, the term of this patent is extended or adjusted under 35 U.S.C. 154(b) by 625 days.

(21) Appl. No.: 10/881,220

(22) Filed: Jun. 30, 2004

(51) Int. Cl.
*G06F 11/00* (2006.01)
(52) U.S. Cl. .................................... 714/47
(58) Field of Classification Search .................... 714/47
See application file for complete search history.

(56) References Cited

U.S. PATENT DOCUMENTS

| 5,748,882 | A * | 5/1998 | Huang ....................... 714/47 |
| 5,966,730 | A | 10/1999 | Zulch |
| 6,170,009 | B1 | 1/2001 | Mandal et al. |
| 6,295,611 | B1 | 9/2001 | Connor et al. |
| 6,430,703 | B1 | 8/2002 | Connor et al. |
| 6,539,462 | B1 | 3/2003 | Mikkelsen et al. |
| 7,032,126 | B2 * | 4/2006 | Zalewski et al. .............. 714/7 |
| 7,069,401 | B1 | 6/2006 | Noonan et al. |
| 7,093,162 | B2 | 8/2006 | Barga et al. |
| 7,246,254 | B2 * | 7/2007 | Alur et al. ..................... 714/2 |
| 2002/0035706 | A1 | 3/2002 | Connor et al. |
| 2002/0049912 | A1 | 4/2002 | Honjo et al. |
| 2003/0225800 | A1 | 12/2003 | Kavuri |
| 2003/0225801 | A1 | 12/2003 | Devarakonda et al. |
| 2004/0078334 | A1 | 4/2004 | Malcolm et al. |
| 2005/0039069 | A1 * | 2/2005 | Prahlad et al. ................. 714/2 |
| 2005/0066239 | A1 * | 3/2005 | Keeton et al. ................ 714/47 |
| 2005/0102547 | A1 * | 5/2005 | Keeton et al. ................. 714/1 |
| 2005/0262377 | A1 * | 11/2005 | Slim-Tang ..................... 714/1 |

OTHER PUBLICATIONS

Office Action from U.S. Appl. No. 10/881,615, mailed Mar. 20, 2007.
IGG-03172004-01, C. Claunch, "Management Update: Best Practices in Business Continuity and Disaster Recovery," Artivle Mar. 17, 2004, Gartner, Inc., 13 pages.
Strategic Planning, SPA-21-3174, R. Paquet, C. DiCenzo, "Predicts 2004: Recovery Replaces Backup and Replication," Resaeach Note, Nov. 18, 2003, Gartner, Inc., 3 pages.
Dynamic Markets "Utility Computer: The CIO Squeeze?", Independent Market Research Repot commissioned by VERITAS, Sep. 2003, 151 pages.

(Continued)

*Primary Examiner*—Scott Baderman
(74) *Attorney, Agent, or Firm*—Lawrence J. Merkel; Meyertons, Hood, Kivlin, Kowert & Goetzel, P.C.

(57) ABSTRACT

In one embodiment, a method is contemplated. The method includes exposing at least three dimensions of a protection system to a user. The three dimensions are interrelated. The method further includes receiving user input indicating a modification in a first dimension of the at least three dimensions; and determining an effect of the modification in each other dimension of the at least three dimensions. A computer accessible medium comprising a plurality of instructions which, when executed, implement the method and a system implementing the method are also contemplated.

15 Claims, 14 Drawing Sheets

OTHER PUBLICATIONS

Office Action from U.S. Appl. No. 10/881,033 mailed Jun. 28, 2007.

Kimberly Keeton, et al., "Automating Data Dependability," ACM-SIGOPS European Workship, Saint-Emilion, France, Sep. 2002, 8 pages.

Kimberly Keeton, et al., "Automatic Design of Dependable Data Storage Systems," Jun. 2003, 6 pages.

Office Action from U.S. Appl. No. 10/881,615, mailed Sep. 24, 2007.

* cited by examiner

| | Parameters 44 | | | | | | | | | | |
|---|---|---|---|---|---|---|---|---|---|---|---|
| | Requirements 46 | | | | | | | Objectives 48 | | | |
| | Method Supports | | Resources | | | | Recovery Target Set | | | | |
| | OS | FS | Other SW | Storage Media | BW | CP | Other | RTT | RPT | Robustness | Other |
| | | | | | | | | W1 | W2 | W3 | W4 |
| Method 1 | V1 | V2 | V3 | V4 | V5 | V6 | V7 | V8 | V9 | V10 | V11 |
| ... | ... | ... | ... | ... | ... | ... | ... | ... | ... | ... | ... |
| Method N | V12 | V13 | V14 | V15 | V16 | V17 | V18 | V19 | V20 | V21 | V22 |

Protection Methods 30

Fig. 4

Recovery Target (RT) Set

- Recovery Point Target (RPT)
- Recovery Time Target (RTT)
- Duration
- Robustness Properties
  - Number of Copies
  - Quality of Storage for Each Copy
  - Physical Location of Each Copy
  ⋮
- Other Properties
  - Expense
  - Security Property
    - ☐ Encryption
    - ☐ Access Control

CONVEYING CAUSAL RELATIONSHIPS BETWEEN AT LEAST THREE DIMENSIONS OF RECOVERY MANAGEMENT

BACKGROUND OF THE INVENTION

1. Field of the Invention

This invention is related to the field of data protection and recovery in computer systems.

2. Description of the Related Art

Data protection for computer systems is an important part of ensuring that the information generated on a computer system and/or stored on the computer system is not lost due to the occurrence of a hardware failure, a software failure, user error, or other environmental event (e.g. power outage, natural disaster, intentionally-caused disaster, accidental disaster, etc.). Generally, events that the data protection scheme is designed to protect against are referred to herein as disaster events. The data protection scheme attempts to make redundant copies of the data and locate those copies such that the data is safe from the disaster events and such that the data can be restored to the computer system or to another computer system rapidly enough to be acceptable given the nature of the data, its importance to the creator of the data, etc.

There are numerous data protection products available in the marketplace, implementing various protection methods and having different options. For example, the protection methods may include clustering, backup, snapshot, and replication.

The cluster method is implemented across multiple computer systems, usually configured substantially identically. Cluster server software monitors the systems to detect failure, and fails over applications from a failing system to a different system so that applications keep executing even if a system failure occurs.

The backup method generally includes copying the data stored on non-volatile storage in a system (or a selected subset of the data), usually according to a backup schedule and often at times when utilization of the system is expected to be lower (e.g. at night, on weekends, etc.). Backup methods include both full backups, in which a copy of the entirety of the selected data is made, and incremental or differential backups, in which only data that has been changed since the most recent backup is copied. In some cases, a backup includes in-memory state as well.

Snapshot methods generally attempt to make a synchronized copy of the state of a computer system at a particular point in time, typically including the state of any processes executing at the time and the in-memory state of the computer system in addition to the data stored in non-volatile storage. In other cases, snapshot methods make a synchronized copy of the state of an application that may be executing on one or more computer systems. If the application is executing on more than one computer system, the snapshot image may be a logical image that comprises one or more physical images of storage objects from the various computer systems. Snapshots are often created with a higher frequency than backup, and often while the system is under higher utilization. The definition of the snapshot state varies from product to product. For example, the state may include a file system, a volume, a disk drive, all of the disk drives in a computer system, all of the disk drives and the in-memory state, etc. Additionally, some snapshot products support creating snapshots to remote computer systems rather than local media.

Replication methods generally replicate data objects from a computer system to another computer system over time. Data objects may be defined differently in different implementations. For example, a data object may be one of the following, in various implementations: a file, a directory structure of files, a volume, a disk block, etc. Replication methods may be incremental, in which the changes to the data object are replicated, or may replicate an entire data object when a change or changes have been made to the data object.

Increasingly, organizations are adopting formal service level agreements (SLAS) with their information technology (IT) departments or third party IT providers. Disaster recovery planners (and/or business continuity planners) in the organization assign recovery requirements to various information assets based on the importance of the information assets to the continued functioning of the organization. Currently, the disaster recovery planners specify a recovery point objective (RPO) and a recovery time objective (RTO). The RPO indicates, relative to a specified point in time, how close in time that it must be possible to recover the state of the corresponding information asset. For example, an RPO of 0 indicates that it must be possible to recover the state of the information asset at any point in time. On the other hand, an RPO of 30 minutes indicates that it must be possible to recover the state of the information asset to a state within 30 minutes of the specified point in time. The RTO specifies the maximum amount of time that the recovery operation may take.

The RTO and RPO are objectives aligned to the organization's needs, but they may not actually be achievable given data protection technology, budgetary constraints, etc. Accordingly, corresponding recovery targets (recovery time target (RTT) and recovery point target (RPT)) are negotiated by the disaster recovery planners with the IT department/provider. The RTT and the RPT are formalized as the SLA. Typically, SLAs only cover the immediate recovery of the current state of an asset in response to a disaster event.

Once the SLAs are in place, the IT department/provider must then establish a protection scheme for the information assets that will meet the SLA. As mentioned above, there are myriad protection methods and protection products available which may provide pieces of an overall protection solution that would meet an SLA. However, the number of combinations and permutations of schemes is dauntingly large. Additionally, protection schemes and products are typically focused on the protection provided, not on the recovery metrics that may be achievable using the schemes/products to recover from a disaster event. Consideration must generally be given to the available resources and/or the resources to be consumed to implement the desired protection. Additionally, each protection method/product may have various restrictions (e.g. the supported operating system platforms and/or support hardware platforms, the supported media, etc.). The data to be protected may have its own similar set of restrictions. Thus, it is difficult to determine a protection scheme that may meet a given SLA with an acceptable consumption of resources and conformance with restrictions. The process of determining and implementing a protection solution may be complex, time-consuming, and error-prone. In many cases, the selected protection solution may be insufficient or over-provisioned due to the inability to properly weigh the various factors in implementing a protection solution.

SUMMARY

In one embodiment, a method is contemplated. The method includes exposing at least three dimensions of a protection system to a user. The three dimensions are interrelated. The method further includes receiving user input indicating a modification in a first dimension of the at least three dimensions; and determining an effect of the modification in each other dimension of the at least three dimensions. A computer accessible medium comprising a plurality of instructions which, when executed, implement the method and a system implementing the method are also contemplated.

BRIEF DESCRIPTION OF THE DRAWINGS

The following detailed description makes reference to the accompanying drawings, which are now briefly described.

FIG. 4 is a block diagram illustrating one embodiment of parameterization data.

FIG. 7 is a block diagram of one embodiment of a recovery target set.

Figure 1:
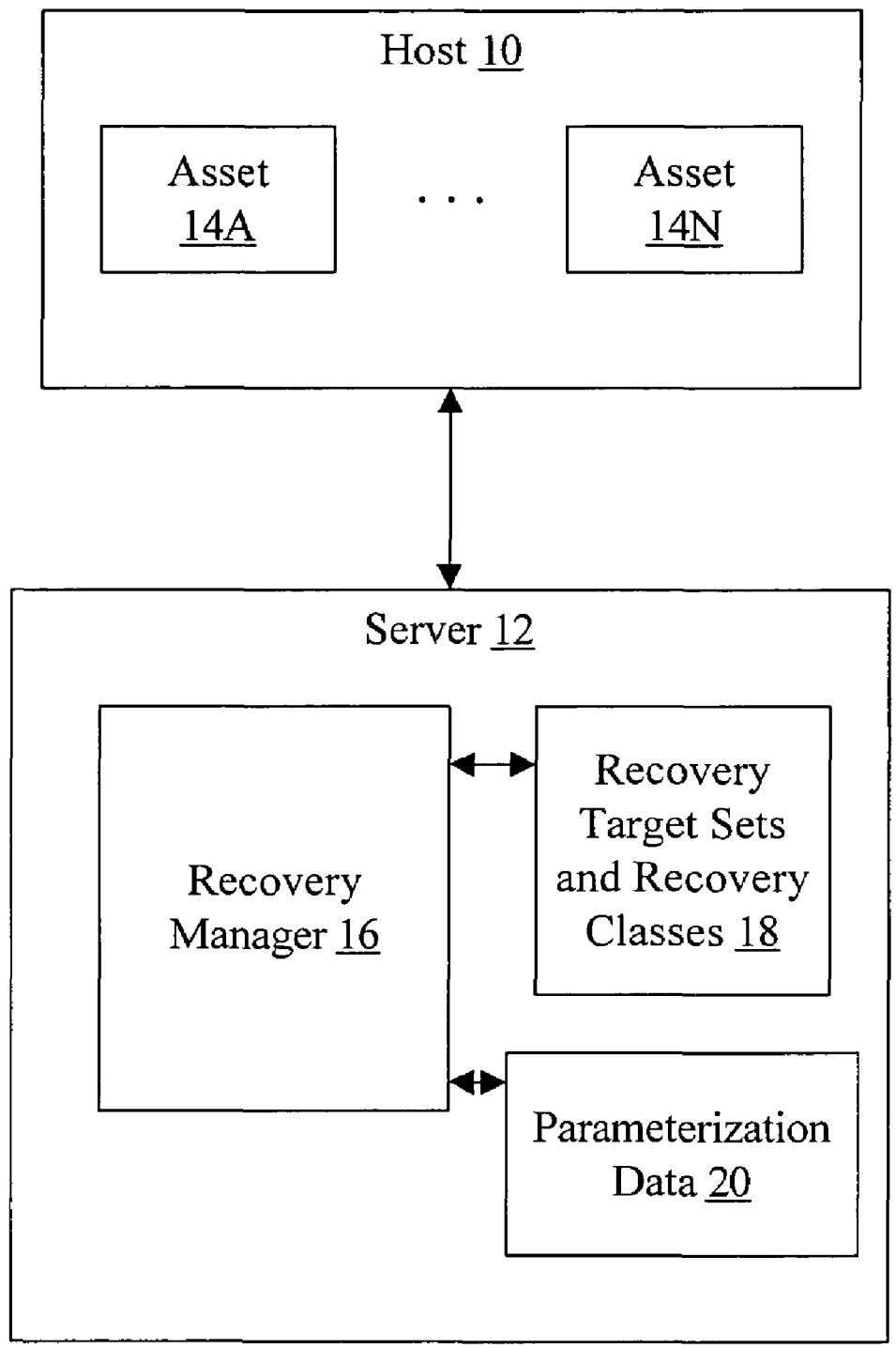
FIG. 1 is a block diagram of one embodiment of a host and a server.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Turning now to FIG. 1, a block diagram is shown illustrating one embodiment of a host 10 and a server 12. The host 10 is coupled to the server 12. The host 10 includes one or more assets (e.g. assets 14A-14N in FIG. 1). In the illustrated embodiment, the server 12 includes a recovery manager 16. In the illustrated embodiment, the server also includes recovery target sets (RT sets) and recovery classes 18 and parameterization data 20.

Generally, the assets 14A-14N are each an entity of computer system data and/or functionality on the host 10 that is to be protected such that it can be recovered after a disaster event. In the context of an asset, computer system data is being used in its generic sense to refer to both data and instruction code, in general, although a given asset may comprise only data or only instruction code. In some cases, a given asset 14A-14N may be a "physical" asset (e.g. a file, the data on a volume or on a physical disk, the data comprising a server, etc.). In other cases, a given asset may be a "logical" asset which groups together two or more assets. The assets comprising a logical asset are referred to as component assets. Component assets may be physical assets, or may themselves be logical assets in some embodiments. For example, an application environment may be a logical asset and may comprise one or more of the application itself, various configuration files for the application, various data files created by and/or used by the application, the volume(s) and/or file system(s) used by the application, the in-memory state of the application if the application is executing, one or more web servers that interface with the application, etc. As a more specific example, the logical asset may be an SAP AG application and the component assets may include the application, one or more underlying databases, one or more web servers, configuration and data files, and in-memory state. In some cases, an asset may span multiple computer systems. That is, portions of the asset may reside on different computer systems.

The recovery manager 16 comprises software configured to assist in developing protection system configurations for the assets 14A-14N. There are a plurality of dimensions for the protection system. The dimensions are aspects of the protection system, and are generally interrelated such that changes made to one dimension have an effect on the other dimensions. Viewed in another way, at least some of the dimensions may have direct causal relationships to the other dimensions, such that changes in a dimension directly cause changes in the other dimensions. For example, in one embodiment, the plurality of dimensions include a protection methods dimension, a recovery targets dimension, and a resources dimension. Changes to the protection methods deployed to protect an asset, for example, impact the recovery targets that may be achieved for that asset and the resources consumed to implement the protection of that asset. Changes to the recovery targets for an asset impact which protection methods may be deployed for that asset, and may also impact the resources consumed in protecting that asset. Changes to the available resources may impact which protection methods may be deployed for an asset and achievable recovery targets for the asset. Other embodiments may include additional dimensions, or subsets of the above dimensions and optionally additional dimensions. For example, cost may be viewed as another dimension (which may be closely aligned to the resources dimension). Each dimension may include a plurality of instances (e.g. each of the protection methods, such as replication, backup, snapshot, etc., may be instances in the protection methods dimension), one or more of which may be selected to implement a protection system. For example, a recovery target set (described below) may be an instance in the recovery targets dimension. Various resources may be instances in the resources dimension.

The protection methods dimension includes the protection methods that are available to be deployed to protect assets. A protection method may be one way of protecting an asset. For example, protection methods may include backup, clustering, snapshot and replication. Additionally, a protection method may specify, in some embodiments, the location of the backup image, snapshot image, or replica. In some embodiments, a protection method may also specify the nature and/or properties media on which the backup image, snapshot image, or replica is stored (e.g. type of storage media, such as tape, compact disk, fixed disk, removable disk, etc.). In other embodiments, a protection method may also include a hardware-implemented protection mechanism. Hardware-implemented protection mechanisms may include redundant array of inexpensive disks (RAID) mechanisms such as mirroring, parity protection, or combinations of mirroring and parity. The RAID mechanisms may also include striping for performance. Hardware-implemented protection mechanisms may further include any other sort of hardware error detection/correction mechanisms, such as error checking/correction (ECC) protection of memory. In some implementations, the protection methods in the protection methods dimension may be limited to the protection methods owned or licensed by the organization that owns the assets 14A-14N (and thus are immediately available for deployment). In other implementations, the protection methods in the protection methods dimension may include protection methods not currently owned/licensed by the organization (to allow planning and potentially subsequent purchase of protection products that implement such protection methods).

The resources dimension includes the resources that are available for implementing the protection system. Resources may include computer system hardware (e.g. central processing unit (CPU) processing power, hardware implemented protection methods, hardware dedicated to supporting protection, etc.), software, network resources (e.g. bandwidth), storage media for storing the asset copies made by the protection methods, etc. Resources may include, in some cases, facilities considerations such as available power supply in a building, available cooling systems, floor space, etc. Resources may also include non-computational resources such as administrator time consumed in implementing and maintaining the protection system, transportation, etc.

The recovery targets dimension includes the desired recoverability properties for the assets. For example, the recovery targets dimension may include the recovery time targets (RTTs) and recovery point targets (RPTs) described above. In one embodiment, the recovery manager 16 may be configured to define one or more RT sets. Each RT set comprises properties describing the desired recoverability of the asset(s) to which the RT set is subsequently applied. For example, in the present implementation, each RT set comprises a recovery point target (RPT), a recovery time target (RTT), and one or more other properties. The RTT specifies the maximum amount of time that the process of recovering the asset may take. The RPT is specified relative to a selected recovery point (wherein the selected recovery point is the point in time at which the state of the asset is to be recovered). That is, the RPT specifies an interval of time relative to the selected recovery point, and the state of the asset is to be recoverable within the interval. That is, a state corresponding to a point in time within the RPT of the selected point in time is to be recoverable. The RPT may thus be viewed as a measure of acceptable data loss. In many recoveries, the selected point may be the time at which the disaster event occurred. In other cases, the selected point may be a point in the past (e.g. prior to a virus infection, or a defined point in time for recovery for legal/regulatory reasons).

The other properties of the RT set may be defined to assist in automated setup of a protection plan for the assets to be associated with the RT set. The RPT and RTT may assist in the automated setup as well. Generally, a protection plan may comprise one or more protection methods that are configured to protect a given asset. In some embodiments, RT sets may be directly applied to assets 14A-14N. In other embodiments, the recovery manager 16 may be configured to define one or more recovery classes. Each recovery class includes one or more RT sets. In one embodiment, the recovery classes may be applied to the assets 14A-14N to define recovery requirements over the life cycle of states of the assets 14A-14N. Different recovery classes may be defined, and may be applied to assets dependent on the importance of the assets to the owner of the assets (e.g. the organization that owns the host 10, such as a business enterprise). That is, each recovery class may represent a different level of importance. A given asset's importance to the organization may be determined, and the recovery class corresponding to that level of importance may be applied to the given asset. The recovery requirements of the given asset over its state life cycle are described by the recovery class applied to the given asset. Protection methods may be configured for the given asset to meet the recovery requirements indicated by the recovery class applied to the given asset.

Additionally, using multiple RT sets in a recovery class to define the recovery requirements over the asset state life cycle may permit the recovery requirements to change as an asset state ages. For example, the recovery requirements early in the asset state life cycle may be more stringent (and thus typically more costly to implement in terms of resources consumed to implement the protection methods), to permit rapid recovery with little data loss in response to a disaster event. On the other hand, recovery requirements later in the asset state life cycle may be governed by the safety of the asset copied and/or legal/regulatory requirements. It may be acceptable for the recovery time to be much longer, and the recovery point may also be larger (e.g. measured in days or weeks rather than minutes or hours). Different RT sets may specify the more and less stringent recovery requirements (or simply the different recovery requirements) at the different points in the asset state life cycle, permitting less costly protection methods to be employed as an asset state ages and/or permitting more appropriate protection methods to be employed.

In some embodiments, the grouping of RT sets into a recovery class may permit the optimization of protection methods across the recovery class. A first protection method/configuration may appear to be desirable when one RT set is viewed in isolation. However, given other RT sets in the recovery class that may apply at different points in the life cycle of the asset state, a different protection method/configuration may actually be more desirable for the asset state life cycle as a whole. For example, if a replication method is selected to meet the properties of a first RT set, and tape backup is selected for a second RT set, the tape backup may take advantage of the replication and make the backup from the replica rather than locally.

RT sets and recovery classes may be defined prior to the existence of the assets 14A-14N, in some cases, and may reflect input from disaster recovery planners and IT administrators responsible for implementing data protection and recovery. The recovery classes may then be applied to the assets 14A-14N. Additionally, as new assets are acquired or created, a recovery class may be applied to the new assets based on their importance. Similarly, if assets change in importance, the applied recovery class may be changed. The defined RT sets and recovery classes may be stored in a data structure (e.g. the RT sets and recovery classes 18).

At least one of the dimensions of the protection system (the "parameterized dimension") may be parameterized for one or more of the other dimensions. The parameterization data 20 represents the parameterization. That is, each instance in the parameterized dimension may be parameterized for one or more of the other dimensions. The parameters included in the parameterization describe the instance in terms of the other dimension(s). Each parameter may be a value which describes a characteristic of the parameterized instance. The parameters facilitate a causal linkage between the dimensions, which may permit translation between selections in one dimension and the effects of the selection in the other dimensions. The parameters may directly correlate to instances in the other dimension, or combinations of parameters may be used to determine appropriate instances in the other dimension. In addition to parameterizing the dimension, the parameterization may further specify other environmental factors of the asset to be protected (e.g. platform support, hardware support, etc.) that may be used in the translation.

The parameterization of each instance may be viewed as an encoding, which can be matched to other encodings. A user may identify a desired result in one of the dimensions (e.g. in the recovery targets dimension). If the desired result is identified and the dimension in which the desired result is identified is not the parameterized dimension, the parameterization encoding that represents the desired result may be generated and matched against the parameterizations in the parameterization data 20. Instances in the parameterized dimension that meet the desired result may be selected in the matching. The selected instances may be scored based on how closely the instances match the desired result. In some embodiments, weights may be assigned to the parameters (or to a selected subset of the parameters), and the weights may be used in generating the score. Additionally, the parameterized encodings may be used for comparing different instances in the parameterized dimension. On the other hand, if an instance in the parameterized dimension is selected as the desired result, the parameterization of that instance may be used to determine the corresponding instances in the other dimensions. For example, if the protection methods dimension is the parameterized dimension, a selected protection method (e.g. replication to a remote site) may be specified. The parameters of the selected protection method may directly specify the instances of the other dimensions (e.g. the recovery targets and resources), or combinations of the parameters of the selected protection method may be combined to generate the instances of the other dimensions.

Generally, a parameterization encoding generated from a desired result may be "evaluated" over the parameterization data 20 to generate a result of the translation from the desired result's dimension to the parameterized dimension. Generally, evaluating a parameterization encoding may include comparing the parameterization encoding to the parameterization data to identify which parameterized instances may be eligible for selection and to rate the instances according to which are most likely to meet the desired result indicated by the parameterization encoding. In some embodiments, the parameterization encoding may be divided into a "requirements" portion and an "objectives" portion. The requirements portion may include parameters that are required to be met by an instance to be selected as a result of the translation. If a given instance cannot meet any one of the requirements, the instance is not eligible for selection in the translation. The objectives portion may include parameters that indicate desired properties in the result. The desired objectives should be met but, in some cases, may not be met by an instance. An instance that is eligible may be ranked based on its ability to meet the objectives portion of the parameterization encoding. That is, an instance that may meet more objectives than another instance may be ranked higher than that other instance. If weights are assigned to objectives, an instance that meets objectives that combine to form a higher score may be ranked higher than another instance that meets more objectives but those objectives have lower weights. If weights are assigned to select parameters, then an instance that may qualitatively score higher in the ability to meet objectives than other instances that have a higher quantitative objective score.

Parameterization encodings generated from desired results may be incomplete as compared to the parameterization data 20. That is, a parameterization encoding generated from a desired result may not specify one or more parameters that are included in the parameterization data. In such cases, parameters that are not included in the parameterization encoding may be ignored in the evaluation. Similarly, in some cases, parameterization encodings generated from desired results may include don't cares for various parameters, and such parameters may not be included in the evaluation.

An example embodiment described in more detail below parameterizes the protection methods for the recovery targets and/or the resources. However, any of the other dimensions may be parameterized in other embodiments. Additionally, if desired, more than one dimension may be parameterized for the other dimensions (e.g. the protection methods dimension may be parameterized for other dimensions, and the recovery targets dimension may be parameterized for other dimensions as well). In the exemplary embodiment, the parameterization of the protection methods for the recovery targets may indicate, for each protection method, the recovery targets that the protection method may support. Similarly, the parameterization of the protection methods for resources may indicate the resources consumed to implement the protection methods.

The host 10 comprises one or more computer systems that store and/or manipulate and/or execute the assets 14A-14N. In some cases, external storage such as network attached storage (NAS) or storage area network (SAN) storage may store some of the assets 14A-14N, and the host 10 may comprise the NAS/SAN storage as well.

In the illustrated embodiment, the server 12 executes the recovery manager 16. Generally, the server 12 comprises software that may be executed on a computer system. In some embodiments, the server 12 may be executed on a separate computer system from those in the host 10. In such embodiments, the computer system executing the server 12 may be configured to communicate with the computer system(s) in the host 10 (e.g. via a network). In other embodiments, the server 12 may be executed on a computer system in the host 10. Additionally, some embodiments may include no servers (that is, the recovery manager 16 may be executed on the host 10). In still other embodiments, the recovery manager 16 may be executed on another computer system that has no server relationship to the host 10 (e.g. on an administrator's computer system).

In various embodiments, user input may be accepted. User input may be provided to the recovery manager 16 in any desired fashion. Generally, the computer system that is executing the recovery manager 16 may have one or more user input devices such as a keyboard, a mouse or other pointing device, voice input, touch screen, etc. The user may provide user input via the user input devices. In other cases, user input may be asynchronous and/or automatic. For example, the user may preconfigure automatic information feeds into the recovery manager 16, such as an application programming interface that redirects information from other systems/databases. Alternatively, input may be provided through files, transmitted from other applications, etc.

Parameterization and Translation Between Dimensions

Figure 2:
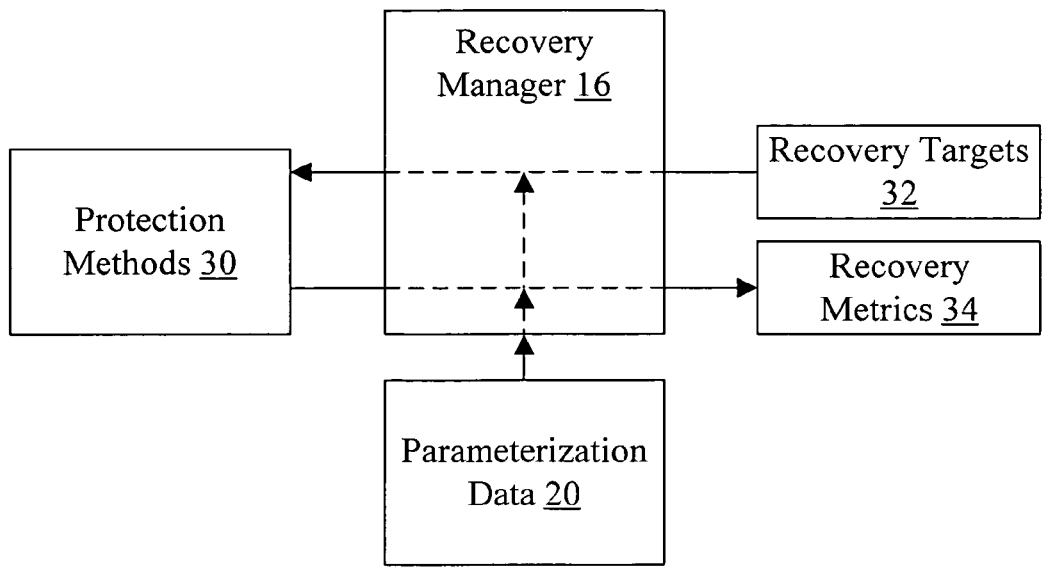
FIG. 2 is a block diagram of one embodiment of a recovery manager using parameterization data to translate between protection methods and recovery targets/metrics.

FIG. 2 is a block diagram of one embodiment of the recovery manager 16 using the parameterization data 20 to translate between protection methods and recovery targets/metrics. The protection methods 30 are shown, as are the recovery targets 32 and recovery metrics 34. Recovery targets 32 may comprise RT sets (and/or recovery classes containing RT sets, as described above), in one embodiment. Recovery metrics 34 may be related to recovery targets 32, but may be a measure of achievable recovery targets given a selected protection method or methods from protection methods 30.

Thus, a user may provide one or more recovery targets (e.g. an RT set) 32, and the recovery manager 16 may use the parameterization data 20 to translate the recovery targets 32 to one or more protection methods 30 that meet the specified recovery targets. That is, the specified recovery targets 32 may be the desired result in the recovery targets dimension, and the recovery manager 16 may use the parameterization data 20 to identify protection methods 30 that may produce the desired result. In an embodiment in which the protection method dimension is the parameterized dimension, the recovery targets 32 may be used to generate a parameterization encoding for evaluation against the parameterization data 20. Evaluating the parameterization encoding generated from the recovery targets 32 over the parameterization data 20 may identify which protection methods 30 support the recovery targets 32.

In some embodiments, the translation may include ranking the protection methods according to their ability to meet the recovery targets (e.g. according to a score generated for each protection method, either weighted or unweighted) and presenting the ranked results to the user. In other embodiments, the translation may include selecting the highest ranking protection method (the protection method having the best score) and providing the protection method as the result of the translation.

Additionally, the recovery manager 16 may be provided with a selected protection method or methods 30, and may translate the selected protection method to a set of recovery metrics 34. In an embodiment in which the protection method dimension is the parameterized dimension, the recovery manager 16 may read the parameterization that corresponds to the selected protection method from the parameterization data 20, and may use the parameterization to calculate the recovery metrics 34.

Figure 3:
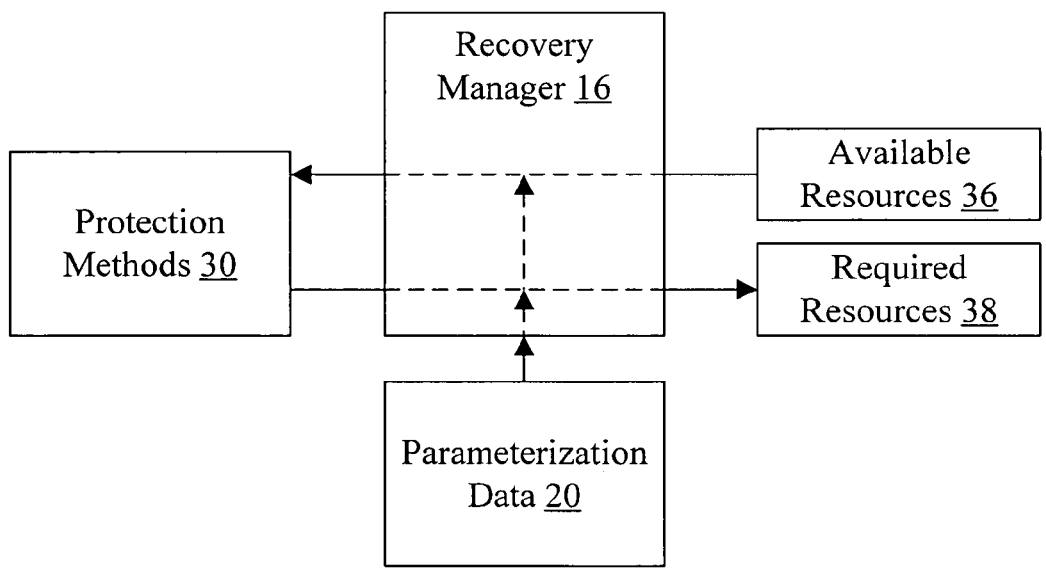
FIG. 3 is a block diagram of one embodiment of a recovery manager using parameterization data to translate between protection methods and available/required resources.

FIG. 3 is a block diagram of one embodiment of the recovery manager 16 using parameterization data to translate between protection methods and available/required resources.

A user may identify one or more available resources 36, and the recovery manager 16 may use the parameterization data 20 to translate the available resources 36 into which protection methods 30 may be implemented given the available resources 36. That is, the available resources 36 may be viewed as the desired result in the resources dimension, and the recovery manager 16 may use the parameterization data 20 to identify protection methods 30 that may produce the desired result (that is, consume no more resources than the available resources 36). In an embodiment in which the protection method dimension is the parameterized dimension, the available resources 36 may be used to generate a parameterization encoding for evaluation against the parameterization data 20. Evaluating the parameterization encoding generated from the available resources 36 over the parameterization data 20 may identify which protection methods 30 are supported by the available resources 36.

Additionally, the recovery manager 16 may be provided with a selected protection method 30, and may translate the selected protection method to a set of required resources 38. The required resources 38 may represent the resources consumed by the selected protection method. In an embodiment in which the protection method dimension is the parameterized dimension, the recovery manager 16 may read the parameterization that corresponds to the selected protection method from the parameterization data 20, and may use the parameterization to calculate the required resources 38.

In embodiments in which the parameterization data 20 parameterizes the protection methods dimension for both the recovery targets dimension and the resources dimension, translation may be supported between multiple dimensions. For example, translation from recovery targets 32 to required resources 38 may be provided by translating through the protection methods 30. That is, translation from recovery targets 32 to protection methods 30 may be performed, followed by translation from protection methods 30 to required resources 38. In other embodiments, multiple parameterizations may be provided some or all of the dimensions in terms of the other dimensions to permit direct translation between dimensions.

Turning next to FIG. 4, a block diagram illustrating one embodiment of parameterization data 20 is shown. FIG. 4 shows the parameterization data 20 in tabular form for ease of illustration. The parameterization data 20 may actually be stored in any desired form. The parameterization data 20 is shown in the table below the heavy line 40 and to the right of the heavy line 42. To the left of the heavy line 42 are the protection methods 30. That is, each row in FIG. 4 corresponds to a different protection method. Above the heavy line 40, the various parameters 44 included in the parameterization are shown. For each protection method 30, a value is included in the parameterization for each parameter 44. For example, values represented by V1 to V11 are shown for method 1 in the table.

In the illustrated embodiment, the parameterization is divided into a requirements portion 46 and an objectives portion 48. The requirements portion 46 includes two sub portions in the illustrated embodiment: a "method supports" portion and a "resources" portion. The method supports portion may specify requirements that are supported by the method (e.g. which operating systems (OS) are supported, which filesystems (FS) are supported, which other software (Other SW) is supported, etc.). The resources portion may specify resource requirements of the method (e.g. the storage media, the network bandwidth (BW), the CPU power (CP) and other resources.). The resources portion of the requirements 46 corresponds to the resources dimension in this embodiment.

Generally, when a parameterization encoding is evaluated over the parameterization data 20, the requirements portion 46 may be used to eliminate from consideration methods that do not match the corresponding requirements portion of the parameterization encoding. That is, the method supports portion of a method represented in the parameterization data 20 must indicate support for the requirements in the method supports portion of the parameterization encoding. If the parameterization encoding includes an indication of resources that are available, the available resources must meet the resources portion of the requirements. If either condition is not met, the method may be eliminated from further consideration. In other embodiments, if either condition is not met, the user may be informed of the requirements that are not met, and thus what would be required if the method were to be selected.

The parameters in the requirements section of the parameterization may be represented in any fashion. For example, a bit vector may be used for each parameter, with each bit representing a variation of the requirement. For the OS parameter, the bits of the bit vector may correspond to different operating systems and/or different versions of an operating system. Similarly, for the filesystems parameter, the bits may correspond to different filesystems and/or versions of filesystems. For the other software parameter, the bits may each correspond to different software product (or version thereof) included in the other software parameter. In the method supports section, each bit may indicate whether or not the method supports the identified variation (e.g. supported when set, not supported when clear, or vice versa). In the resources section, each bit may indicate whether or not the method requires the identified resource (e.g. required when set, not required when clear, or vice versa). In other embodiments, the values may not be bit vectors. For example, the values may be symbols identifying supported/required variations, numeric values representing versions, etc. In yet other embodiments, each variation of the parameters described above may be an individual parameter (e.g. each OS and/or OS version may be an individual parameter), and a bit or value may be assigned to the parameter, similar to the description of the bit vector above. In still other embodiments, the parameterization data 20 may be represented in other fashions. For example, a relational database may be used and each value/parameter may be a database tuple.

The objectives portion 48 includes parameters 44 corresponding to the recovery targets dimension in the illustrated embodiment. The recovery targets portion includes, in this example, the various properties defined for an RT set (described in more detail below with regard to FIG. 7). Particularly, the RTT and RPT are shown, along with a robustness property and various other properties.

The parameters in the objectives portion 48 of the parameterization may be represented in any fashion. For example, the RTT and RPT parameters may be numeric, specifying the minimum RTT and RPT that the method may support. In other embodiments, other values may be used. For example, a database representation of the parameters may be used. In yet another example, bit vectors may be used for each parameter, as described above for the requirements section. The RTT or RPT parameters may have a bit vector with bits for different non-overlapping ranges of RTT or RPT values, and the bit may indicate if the method supports RTTs/RPTs in the corresponding range.

As mentioned previously, in some embodiments, weights may be applied to various parameters in the objectives portion of the parameterization. The weights are illustrated in FIG. 4 above heavy line 40 (W1, W2, W3, and W4). Weights for various parameters may be assigned by setting the W1 to W4 values.

Comparing parameters in the parameterization encoding may thus depend on how the parameters are represented. If bits/bit vectors are used, bitwise comparison for selection or exclusion may be used. If numeric values are used, greater than/less than/equal to comparisons may be used. If symbolic values are used, the character comparisons/string matching may be performed. Database queries may be used in yet another example.

While the embodiment of FIG. 4 illustrates the recovery target set parameters as entirely in the objectives portion 48, other embodiments may include some or all of the recovery target set parameters in the requirements portion 46, as desired. In other embodiments, the parameterization data may include only the recovery target set parameters or only the resources parameters. In other embodiments, the user may be permitted to specify whether each parameter is required, desired (optionally with a weight assigned to the parameter), or to-be-determined by the recovery manager 16.

In some embodiments, the parameterization data 20 may be stored relatively statically, and may be provided with the recovery manager 16. In other embodiments, some or all of the parameterization data 20 may be generated dynamically by the recovery manager 16. In other embodiments, various methods may have commonality (e.g. the methods implemented within the same protection product may have common method supports parameters, common resources parameters, and/or commonality in the resources consumed). In such embodiments, the parameterization data 20 may be kept in an encoded form and may be dynamically expanded for more rapid/easier processing by recovery manager 16.

Figures 5, 6:
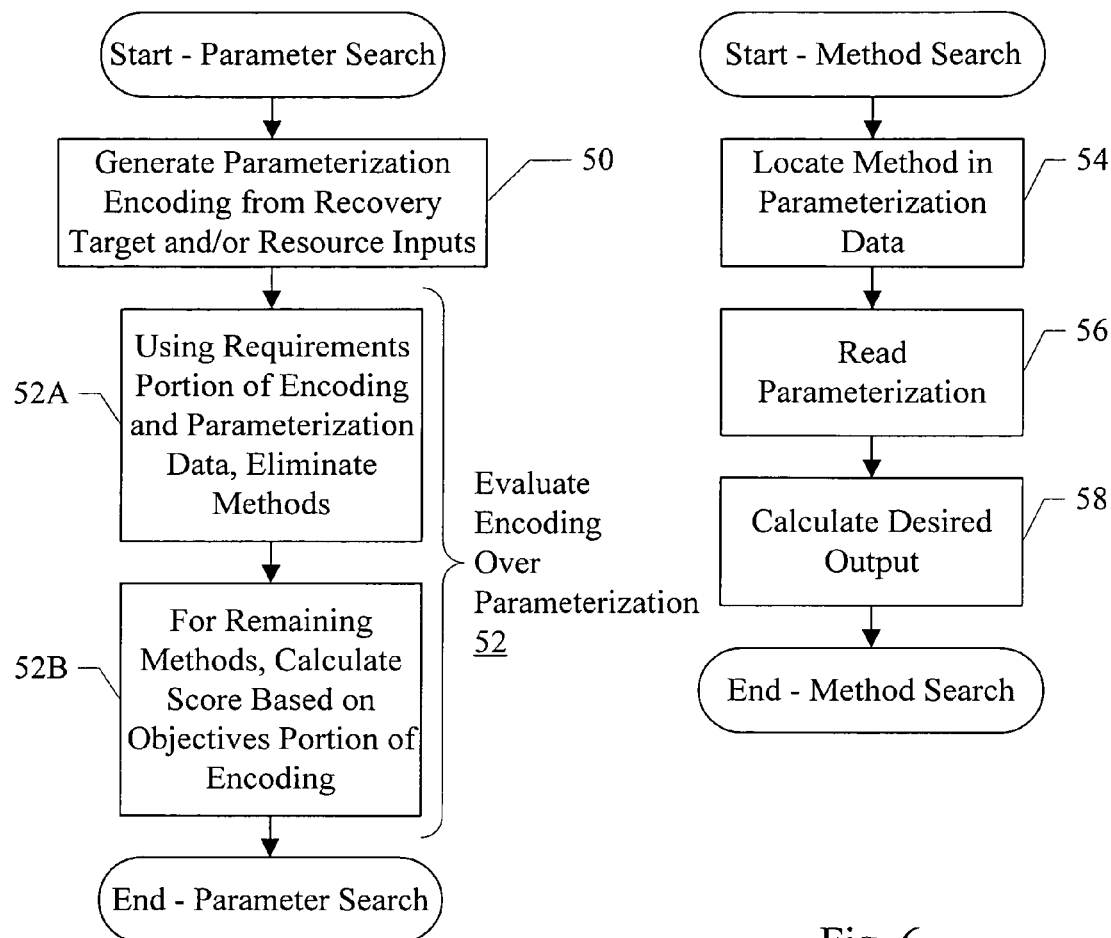
FIG. 5 is a flowchart illustrating one embodiment of searching based on a dimension for which parameters are stored in the parameterization data.
FIG. 6 is a flowchart illustrating one embodiment of searching based on a parameterized dimension.

Turning now to FIG. 5, a flowchart is shown illustrating operation of one embodiment of the recovery manager 16 for performing a parameter search in the parameterization data 20. That is, the flowchart of FIG. 5 may illustrate operation when given one or more recovery targets or one or more resources, to translate to corresponding protection methods. The recovery manager 16 may comprise instructions which, when executed, implement the operation of FIG. 5.

The recovery manager 16 may generate a parameterization encoding from the recovery target and/or resource inputs (block 50). As mentioned previously, other environmental requirements of the asset 14A-14N to be protected (e.g. the implemented OS, filesystem, etc.) may also be used in the parameterization encoding. The parameterization encoding generated by the recovery manager 16 may use the same encoding definition as the parameterization data 20 uses. In addition, in some cases, don't care values may be provided for some parameters in the generated encoding if the parameters can not be calculated from the inputs or are otherwise known to be don't cares for the current operation. In other cases, some parameters may be left unspecified so that the recovery manager 16 may determine the parameters as part of the selection process.

The generated parameterization encoding is then evaluated over the parameterization data 20 (reference numeral 52). In the illustrated embodiment, evaluating the generated parameterization encoding includes eliminating protection methods from consideration using the requirements portion of the parameterization encoding (block 52A) and, for the remaining protection methods, calculating a score based on the objectives portion of the parameterization encoding (block 52B). Other embodiments may not include a requirements section, and block 52A may not be included.

It is noted that blocks 52A and 52B may be implemented in one pass through the parameterization data 20, in some embodiments. In other embodiments, multiple passes may be used (e.g. at least one pass for each of blocks 52A and 52B).

The score that is calculated for each remaining protection method may be a relative or absolute measure of the protection method's ability to meet the objectives portion of the generated parameterization encoding. Any scoring method may be used. For example, the score may be a sum of how many objectives may be met by the protection method. If weights are used, the score may be the sum of the weights of the objectives that may be met by the protection method. Alternatively, if weights are used, the score may be the sum of the weighted deviations from the objectives that may be met by the protection method. Any other way of calculating the score may be used, as long as scores for different protection methods may be numerically comparable. For example, the highest score may be considered to be the best, or the lowest score, depending on how the score is calculated.

In some embodiments, the recovery manager 16 may select the protection method to be provided as the result of the translation (e.g. the protection method having the best score). In other embodiments, the recovery manager 16 may display the results of the evaluation. For example, methods may be sorted by score and displayed. The numerical value of the score may be displayed, or a graphical depiction of the relative values of the scores may be used (e.g. one to three stars for each protection method, dependent on the score, although any number of stars or other graphical depictions may be used). In still other embodiments, the recovery manager 16 may display the results along with recovery-manager-determined parameters for further selection by the user. In another embodiment, the score may comprise multiple values or variables, and the graphical depiction of the score may be capable of illustrating the multiple values. For example, a Kiviat diagram may be used to display the scores.

FIG. 5 illustrates operation if the protection method dimension is the parameterized dimension. In other embodiments that parameterize a different dimension, a similar flowchart may be used to identify instances of the parameterized dimension that satisfy one or more inputs within another dimension.

FIG. 6 is a flowchart is shown illustrating operation of one embodiment of the recovery manager 16 for performing a method search in the parameterization data 20. That is, the flowchart of FIG. 6 may illustrate operation when given a protection method, to translate to another dimension (e.g. the recovery metrics or the required resources, or both). The recovery manager 16 may comprise instructions which, when executed, implement the operation of FIG. 6.

The recovery manager 16 may locate the method in the parameterization data 20 (block 54). The recovery manager 16 may read the corresponding parameterization (block 56), and may calculate the desired output (block 58). In some cases, the parameterization may directly identify the output (e.g. recovery metrics or required resources). In other cases, the parameterization may be processed to determine the output.

RT Set and Recovery Class Definition

FIG. 7 is a diagram illustrating one embodiment of the contents of an RT set. Other embodiments may implement different RT sets which may include additional properties, or which may include any subset of the properties shown in FIG. 7, or which may include any subset and additional properties, as desired. As mentioned above, the RT set may include the RPT and RTT. The RPT and the RTT may typically correspond to the RPT and RTT specified in an SLA, for example.

A duration property is shown in FIG. 7. The duration property may specify a time interval over which the RT set applies to the asset. For example, the duration property may be measured relative to the age of the asset. In some embodiments, the duration property may specify the end of the time interval (e.g. first 24 hours, first seven days, etc.). In other embodiments, both the start and the end of the time interval may be specified (e.g. after the first 24 hours and within the first seven days, etc.).

A robustness property (or subset of properties) may also be included in an RT set. Generally, the robustness property may specify various aspects of a protection method that indicate how resilient the protection is as compared to various disaster events. That is, a protection method may be more robust if it is immune to more disaster events (that is, if recovery using the protection method is possible for more disaster events). For example, robustness properties may specify the number of copies to be made of an asset. As another example, the quality of the storage for each copy may be specified. The quality of storage may be measured in a variety of ways. For example, if local disk storage is used, the quality of storage may specify hardware protection methods for the disk such as redundant array of inexpensive disks (RAID) levels. If tape media or other removable media is used, quality may be measured in terms of the number of times the media has been written and/or its age. Another example may be the physical location of each copy. The physical location may be a specific location, or may indicate a third party method such as vaulting. In other cases, the physical location may be specified relative to the source asset. For example, the physical location may be specified in terms of distance from the source asset, or in a more qualitative sense relative to the source asset such as off host, off campus, or third party. Additional levels of qualitative granularity may be provided (e.g. off host but on the same floor as the host, or off the same floor but in the same building, etc.). In yet other embodiments, physical location may be specified as local or remote, where local and remote may be defined separately (e.g. by the administrator, based on how the organization is organized, available remote sites, etc.). Other robustness properties may be defined in other embodiments (as indicated by the ellipses in FIG. 7).

Various other properties may be included in an RT set, in various embodiments. For example, an expense property may be included. The expense property may indicate the desired expense (cost) characteristics of the selected protection method. In various embodiments, the expense property may be specified in different ways. For example, the expense property may specify whether or not minimizing expense is desired (e.g. by minimizing the resources expended to implement the protection method). In another example, the expense property may be a qualitative measure (e.g. high, medium, low). In yet another example, the expense property may be an order of magnitude indication approximating the desired maximum expense.

In some embodiments, a security property may be included in the RT set. The security property may generally specify mechanisms to prevent unauthorized access to/use of the asset. For example, the security property may include an encryption property that may specify whether or not encryption is desired. Alternatively or additionally, the encryption property may specify the type of encryption to be used. In some cases, the encryption type may be specified via law or regulation (e.g. the health insurance portability and accountability act of 1996, or HIPAA, provides strong medical record privacy rights and thus encryption would be required for third party storage of patient medical records). The security property may include an access control property that specifies the extent to which access is granted to various users. For example, the access control property may list users and the access permitted, may control access according to user membership in various predefined groups, etc.

As indicated by the second ellipses in FIG. 7, various other properties may be included in other embodiments, as desired.

It is noted that, in some embodiments, the RT set may also support weighting factors for each property, to permit some programmability of the importance of meeting the various properties. Alternatively, the recovery manager 16 may support programmable weighting of the properties.

Figure 8:
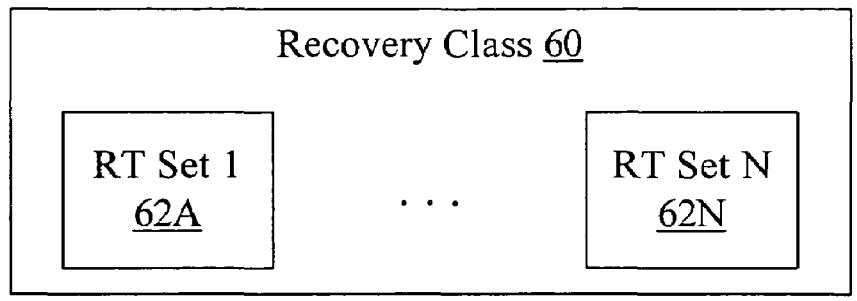
FIG. 8 is a block diagram of one embodiment of a recovery class.

FIG. 8 is a block diagram that diagrammatically illustrates one embodiment of a recovery class 60. The recovery class 60 is a set of at least one RT set, and may include multiple RT sets (e.g. RT sets 62A-62N in FIG. 8). The actual representation of the recovery class in the data structures (e.g. reference numeral 18) may be any desired representation.

In some embodiments, a recovery class 60 may also include a resource type constraint. The resource type constraint may be used to exclude certain resources from use in the protection methods, or alternatively to require that certain resources be used. In some embodiments, a recovery class 60 may also include an asset type constraint that may be used to constrain a recovery class to be used for one or more asset types (e.g. an asset type may be a database, or a specific vendor's database). The asset type constraint may be used to restrict the selected protection methods to those that will work with the specified asset type. In still other embodiments, both the resource type constraint and the asset type constraint may be included in a recovery class 60. In other embodiments, an asset size constraint may also be included in a recovery class 60.

Figure 9:
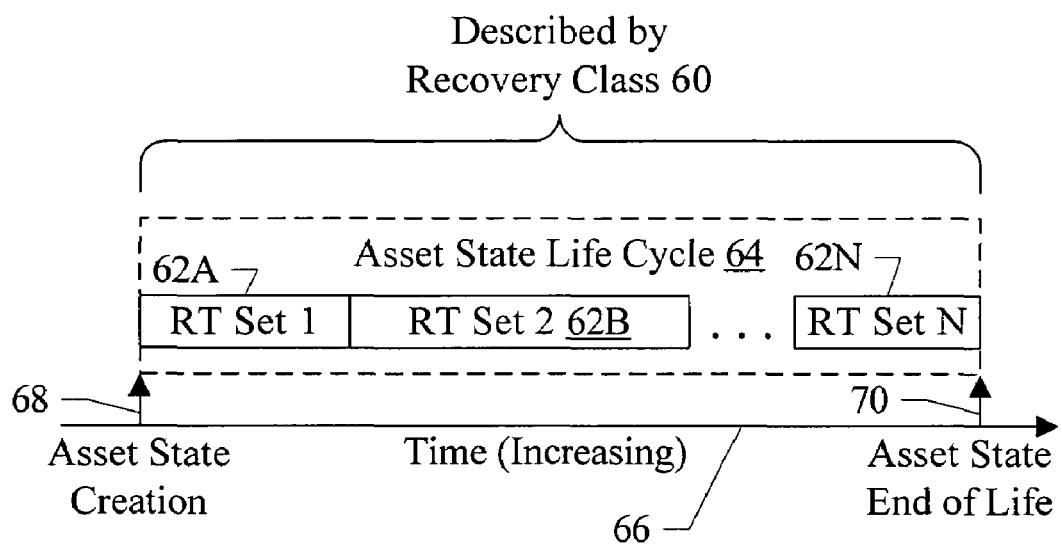
FIG. 9 is a block diagram of one embodiment of an asset state life cycle described by a recovery class.

FIG. 9 is a block diagram illustrating the use of recovery class 60 to describe an asset state life cycle 64. The asset state life cycle 64 is illustrated as an interval of time (time is increasing toward the right in FIG. 8, as indicated by the arrow 66). The asset state life cycle 64 starts at asset state creation (arrow 68) and continues until asset state end of life (arrow 70). Asset state creation may refer to the state of the asset at a given point in time. In some embodiments, the asset state creation may correspond to the time at which a copy of the asset is made according to the protection methods implemented for the recovery class. In other embodiments, the asset state creation may be the point in time prior to the copy being made at which the last change to the asset state occurred. Asset state end of life may be the point at which the asset state is no longer needed. Within the asset state life cycle 64, the RT sets defined in the recovery class 60 are shown. Particularly, in FIG. 9, the RT set 62A specifies the recovery requirements for the early part of the life cycle 64. An RT set 62B specifies the recovery requirements for the next portion of the life cycle 64 after the portion specified by the RT set 62A, and the RT set 62N defines the recovery requirements to the end of the life cycle 64. Additional RT sets (not shown in FIG. 8) may specify the recovery requirements for the portion of the life cycle 64 between the RT set 62B and the RT set 62N, in some embodiments. For the embodiment of RT sets shown in FIG. 7, the duration property of each RT set may specify which portion of the life cycle 64 is governed by a given RT set.

Each RT set 62A-62N may exist for a different period of time with the life cycle 64. For example, in the FIG. 9, the RT set 62B is shown covering a longer portion of the life cycle 64 than the RT sets 62A or 62N. Grouping RT sets into a recovery class and applying the recovery class to the asset may help to ensure that each part of the asset life cycle is covered (i.e. that there are no gaps in the protection of the asset).

While the life cycle 64 illustrates the life cycle of one state of the asset, typically there are many asset states as time moves forward. Thus, at any point in time, there may be many states at different points in the life cycle 64.

Selecting/Optimizing Protection Methods for a Recovery Class

Figures 10, 11:
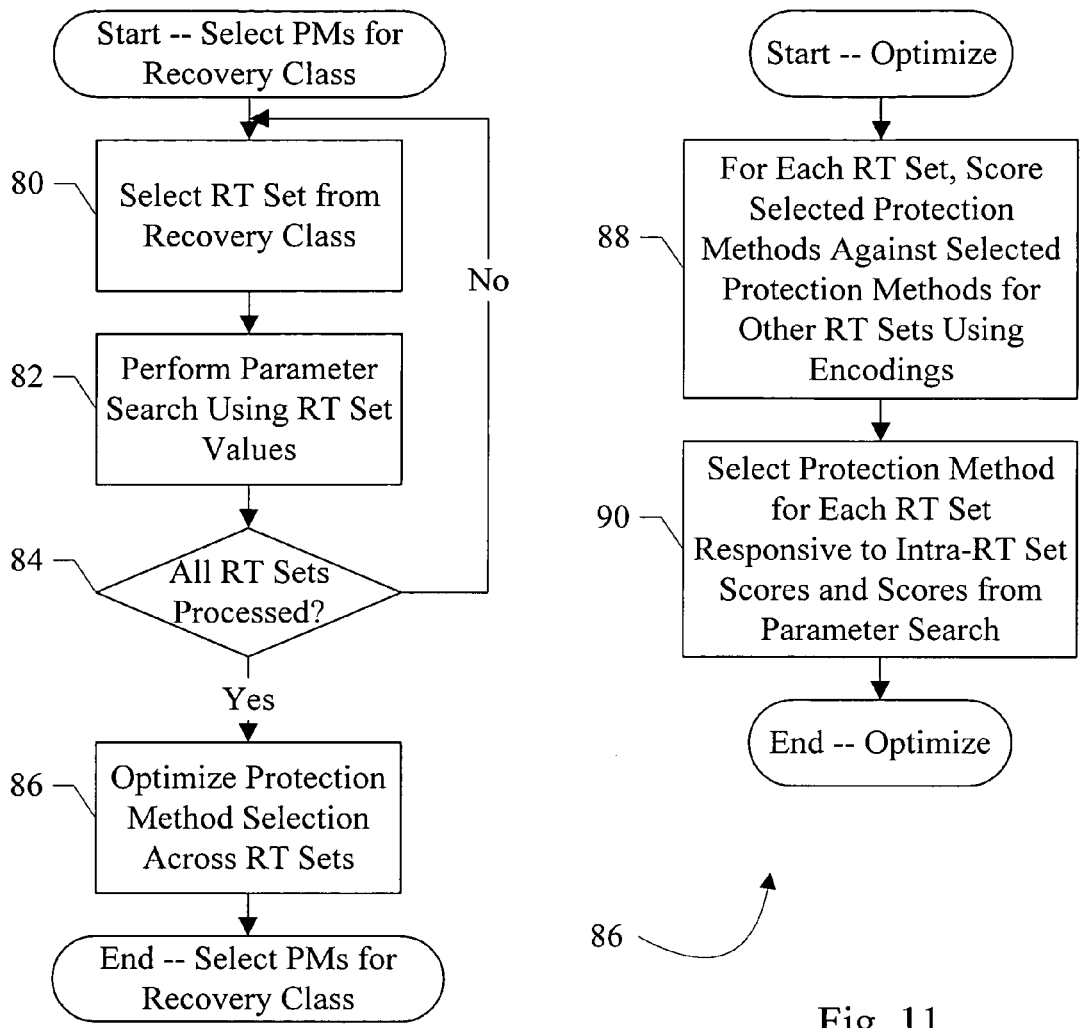
FIG. 10 is a flowchart illustrating one embodiment of selecting protection methods for a recovery class.
FIG. 11 is a flowchart illustrating one embodiment of optimizing selected protection methods across a recovery class.

Turning now to FIG. 10, a flowchart is shown illustrating operation of one embodiment of the recovery manager 16 for selecting protection methods for each RT set of a recovery class. The recovery manager 16 may comprise instructions which, when executed, implement the operation shown in FIG. 10.

The recovery manager 16 may select an RT set from the recovery class (block 80). The recovery manager 16 may perform a parameter search in the parameterization data 20 (block 82) using the RT set as the input values. That is, block 82 may comprise the flowchart of FIG. 5 with the selected RT set's values as the inputs. The result of performing the parameter search, in this case, may be a scored list of one or more protection methods (or zero protection methods, if no protection method meets the RT set specification). The recovery manager determines if each RT set in the recovery class has been processed (decision block 84). If additional RT sets are to be processed (decision block 84, "no" leg), blocks 80 and 82 are repeated for another RT set in the recovery class.

If each RT set has been processed (decision block 84, "yes" leg), the recovery manager 16 may optimize the protection method selection across the recovery class (block 86). In other embodiments, optimization may not be performed and block 86 may comprise selecting the best-scoring protection method for each RT class and forming the protection plan for the recovery class based on the best-scoring protection methods. In some embodiments, the non-optimized protection plan may be viewed as a group, or collection, of independently considered methods. If optimization is performed, the optimization may include attempting to identify dependencies and/or synergies between protection methods that are identified as suitable for different RT sets. For example, if replication is one of the protection methods selected for one RT set, and backup to tape is one of the protection methods selected for another RT set, backup from the remote (replica) copy might be selected for the other RT set. The optimized set of protection methods may be configured into a protection plan for the recovery class. Compared to the non-optimized protection plan, the optimized protection plan may, in some cases, include protection methods which may have some synergy between them, making the overall optimized protection plan more efficient that the non-optimized protection plan even if the components of the optimized protection plan may not, themselves, be the most optimal choice to satisfy the corresponding RT set. In some embodiments, the optimized set of protection methods may be presented to the user for potential modification by the user, and the modified set may be configured into the protection plan. In some embodiments, optimization may be combined with selection (block 80 above).

FIG. 11 is a flowchart illustrating one embodiment of optimizing the protection method selection (block 86 from FIG. 10). In the embodiment of FIG. 11, the optimization may use scoring of the protection methods against each other to aid in selected protection methods. That is, the parameterizations for the protection methods corresponding to one RT set (read from the parameterization data 20) may be evaluated over the parameterizations corresponding to the protection methods for the other RT sets. This scoring may be performed for each RT set against the other RT sets (block 88). The recovery manager 16 may then select a protection method for each RT set responsive to both the intra-RT set scores and the scores from the parameter search (block 90). For example, for a given RT set, the recovery manager 16 may select the protection method having the best score among the intra-RT set scores and the scores from the parameter search. In another case, the protection method having the best intra-RT set score may only be selected if the protection method against which the intra-RT set score was generated is also selected for one of the other RT sets. Alternatively, the best score from the parameter search may be selected unless one of the intra-RT set scores is within a threshold of the parameter search score (and, optionally, if the corresponding protection method is selected in another RT set). It is noted that the optimization shown in FIG. 11 may be performed in addition to, or in concert with, other methods of looking for dependencies/synergies between protection methods selected for each RT set, in some embodiments.

Alternatively, the recovery manager 16 may consider each permutation of protection methods for each RT set to determine the "best" permutation. For example, the recovery manager 16 may score the various permutations by computing totals of the individual scores for the protection methods of each RT set. The scores may vary depending upon the permutation that is being considered.

Reasonable Worst Case Scenario Planning

Figure 12:
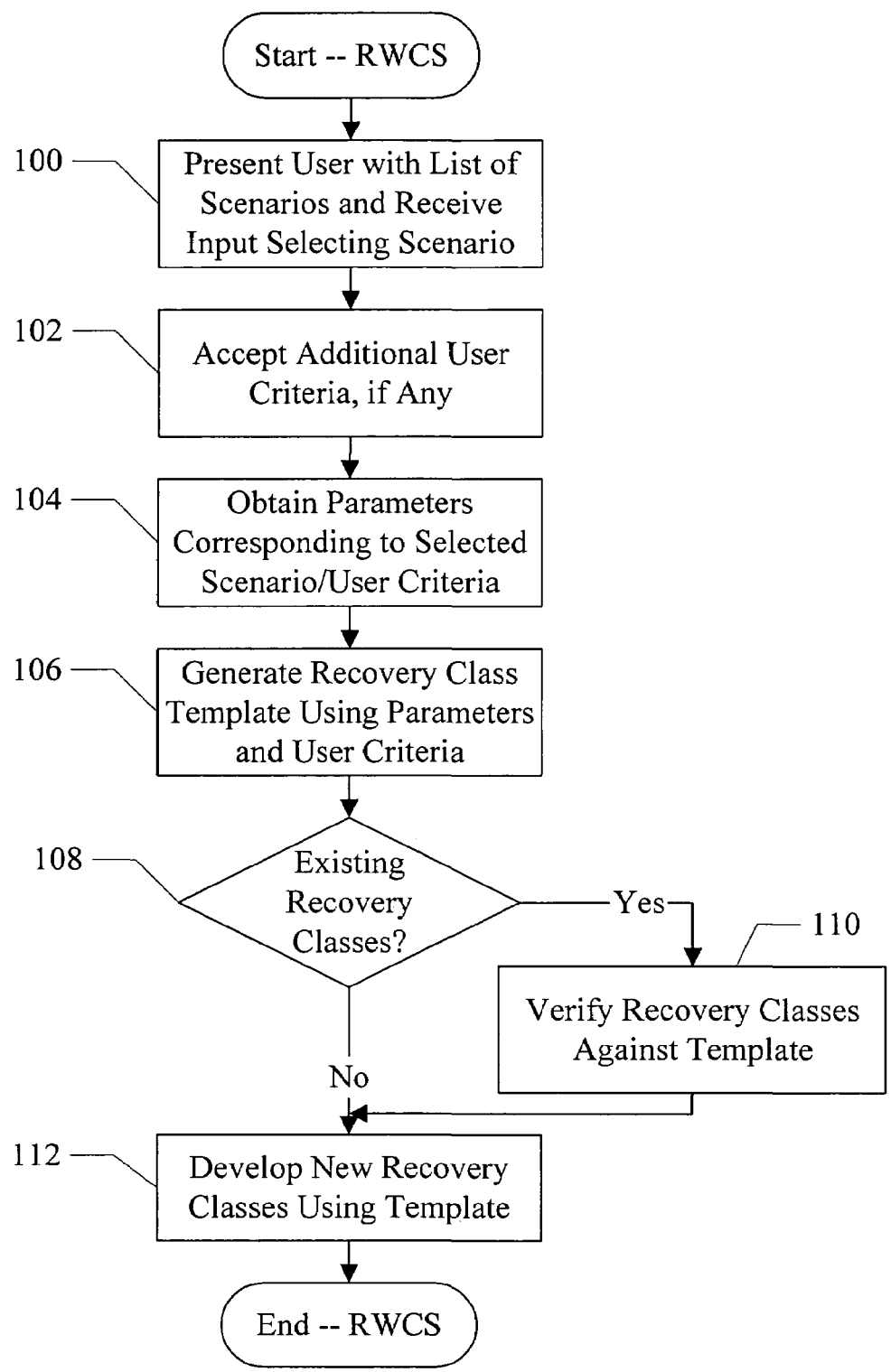
FIG. 12 is a flowchart illustrating one embodiment of recovery class development using a reasonable worst case scenario approach.

FIG. 12 is a block diagram of one embodiment of operation of the recovery manager 16 for generating a recovery class template using a user-selected reasonable worst case scenario. The recovery manager 16 may comprise instructions which, when executed, implement the operation of FIG. 12. In other embodiments, instructions which implement the operation of FIG. 12 may be integrated into a business continuity/disaster recovery planning tool (e.g. the products of Strohl Systems, Inc. (King of Prussia, Pa.)).

Generally, the reasonable worst case scenario (RWCS) may be the worst case disaster that the user desires to protect against. Various RWCSs may be defined (e.g. loss of floor in a building, loss of building, loss of campus, or a geographic event). The geographic event is, in many cases, a superset of one of the other scenarios but also includes potentially the loss of employees and/or inability to physically access the site.

The recovery manager 16 may present the user with a list of RWCSs, and may receive user input selecting one of the scenarios (block 100). In some embodiments, additional user input may be accepted defining additional user criteria (block 102). For example, an acceptable order of magnitude for the RPT and/or RTT may be indicated (e.g. days rather than weeks), or an expense indication may be provided. Based on the selected RWCS and the optional additional user criteria, the recovery manager 16 may obtain parameters corresponding to the selected RWCS (and optionally one or more of the user parameters) (block 104). In one embodiment, a parameterization of default recovery classes to RWCSs may be used, similar to the parameterization of protection methods. The parameterization may be based, e.g., on best practices in disaster recovery for each of the selectable RWCSs. The recover manager 16 may generate the recovery class template or templates using the parameters and user criteria (block 106).

The recovery class templates may not be complete (i.e. the RT classes included in the templates may be missing information). However, information that can be derived from the RWCS and the user criteria is filled in, providing a base to create recovery classes that may provide recovery in the event of the RWCS (referred to as complying with the RWCS). For example, robustness properties that locate copies outside the scope of the RWCS disaster may be generated.

In addition to serving as a basis for creating new recovery classes, the recovery class templates may be used to verify that existing recovery classes, if any, comply with the RWCS. If there are existing recovery classes (decision block 108, "yes" leg), the existing recovery classes may be compared to the recovery class templates to verify that the existing recovery classes comply with the RWCS (block 110). If a recovery class is identified that does not comply, the user may be alerted to the non-compliant recovery class. Alternatively, in some embodiments, the recovery manager 16 may update the recovery class based on the recovery class template to comply with the RWCS. Subsequent recovery classes may be developed using the recovery class template(s) (block 112).

Once recovery classes are constructed using the RWCS approach, the corresponding protection methods may be selected using the parameterization as described above with regard to FIGS. 10 and 11, in some embodiments.

Paradigm Shift Using Translation Between Protection Methods and Recovery Targets/Metrics In some embodiments, the recovery manager 16 attempts to provide the user with the ability to define recovery targets (RT sets/recovery classes) and to translate those RT sets/ recovery classes to protection methods. This method of configuring protection may be a new paradigm in data protection, focused on the recoverability of assets (a "recovery-oriented paradigm"). The current paradigm entrenched in the data protection industry is protection-oriented. That is, a user selects protection methods and configures them into the system to protect assets. Analysis of whether the protection methods meet the recovery SLAs is often estimated by the user (e.g. using spreadsheet calculations, user knowledge and experience, etc.). Alternatively, in some cases, expensive testing may be performed to determine if SLAs are met. If they are not, a process of trial and error with the protection method configurations may be performed until an acceptable solution is found.

While the recovery-oriented paradigm may be more desirable than the protection-oriented paradigm, overcoming the entrenched protection-oriented paradigm may be difficult. Since protecting assets is a critical part of business continuity when a disaster event occurs, relinquishing control over protection configuration to the recovery manager 16 may be problematic for many users to accept. Change may come slowly, since the wrong choice in the protection/recovery of assets may mean the difference between remaining in business or failing in the event of a disaster event.

Figure 13:
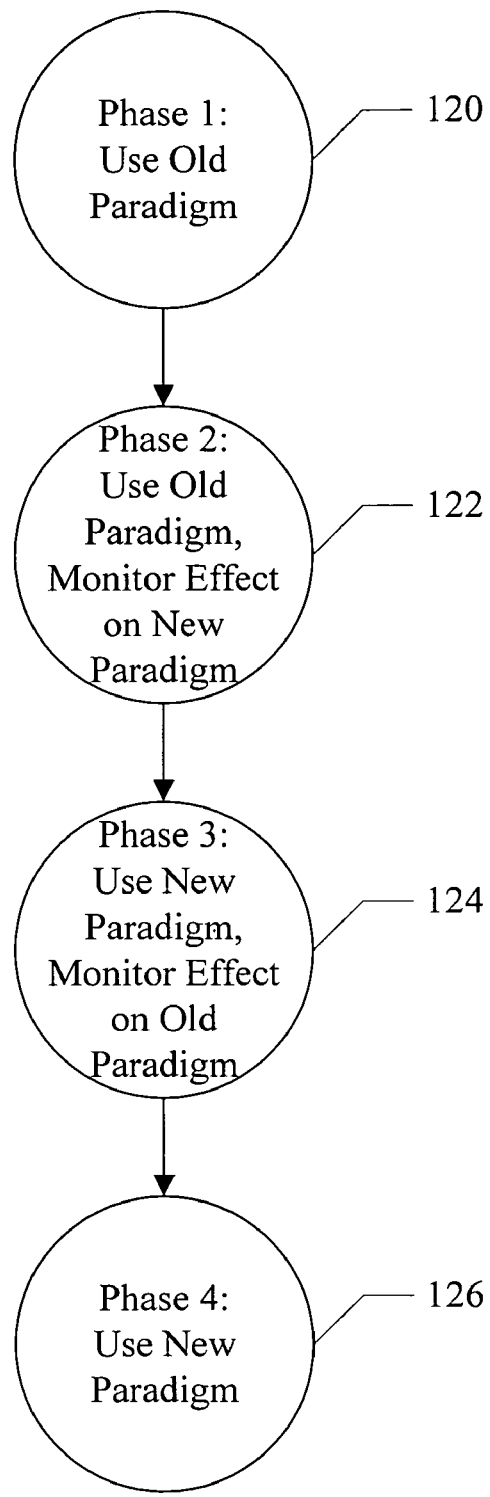
FIG. 13 is a block diagram illustrating phases of a paradigm shift.

Using the ability to translate from protection methods to recovery metrics and from recovery targets to protection methods (see, e.g., FIG. 2), the user may shift to the new recovery-oriented paradigm in phases, building trust in the recovery manager 16 along the way. FIG. 13 illustrates one embodiment of the phases of paradigm shift.

In phase one (reference numeral 120), the user is operating under the old paradigm (protection-oriented). In phase one, no use of the recovery manager 16 occurs.

In phase two (reference numeral 122), the user is still operating under the old paradigm (protection-oriented). However, in phase 2, the user monitors the effects of various protection configurations on the recovery metrics using the recovery manager 16. That is, the user uses the recovery manager 16 to translate the selected protection methods to recovery metrics (FIG. 2). In this manner, the user may learn the relationships between the various protection configurations and the achievable recovery metrics. Additionally, observing the effects on the recovery metrics of various protection configurations may build the user's confidence in the new paradigm (e.g. if recovery metrics meet the user's expectations) and/or may provide insight to the user (e.g. if recovery metrics do not meet the user's expectations).

In phase 3 (reference numeral 124), the user begins using the new paradigm (recovery-oriented). That is, the user generates recovery classes having recovery targets and applies them to assets to determine the protection configuration of those assets. However, in phase 3, the user uses the recovery manager 16 to translate from recovery targets to protection methods (FIG. 2) to view the effects of changes to the recovery targets on the selected protection configuration. Thus, the user may monitor (and approve) the selected protection methods, and may continue to build trust in the new paradigm and its ability to properly select protection methods.

In phase 4 (reference numeral 126), the user has converted to using the new paradigm (recovery-oriented), and no longer monitors the protection configurations.

Using Translation to Predict Required Resources

Figure 14:
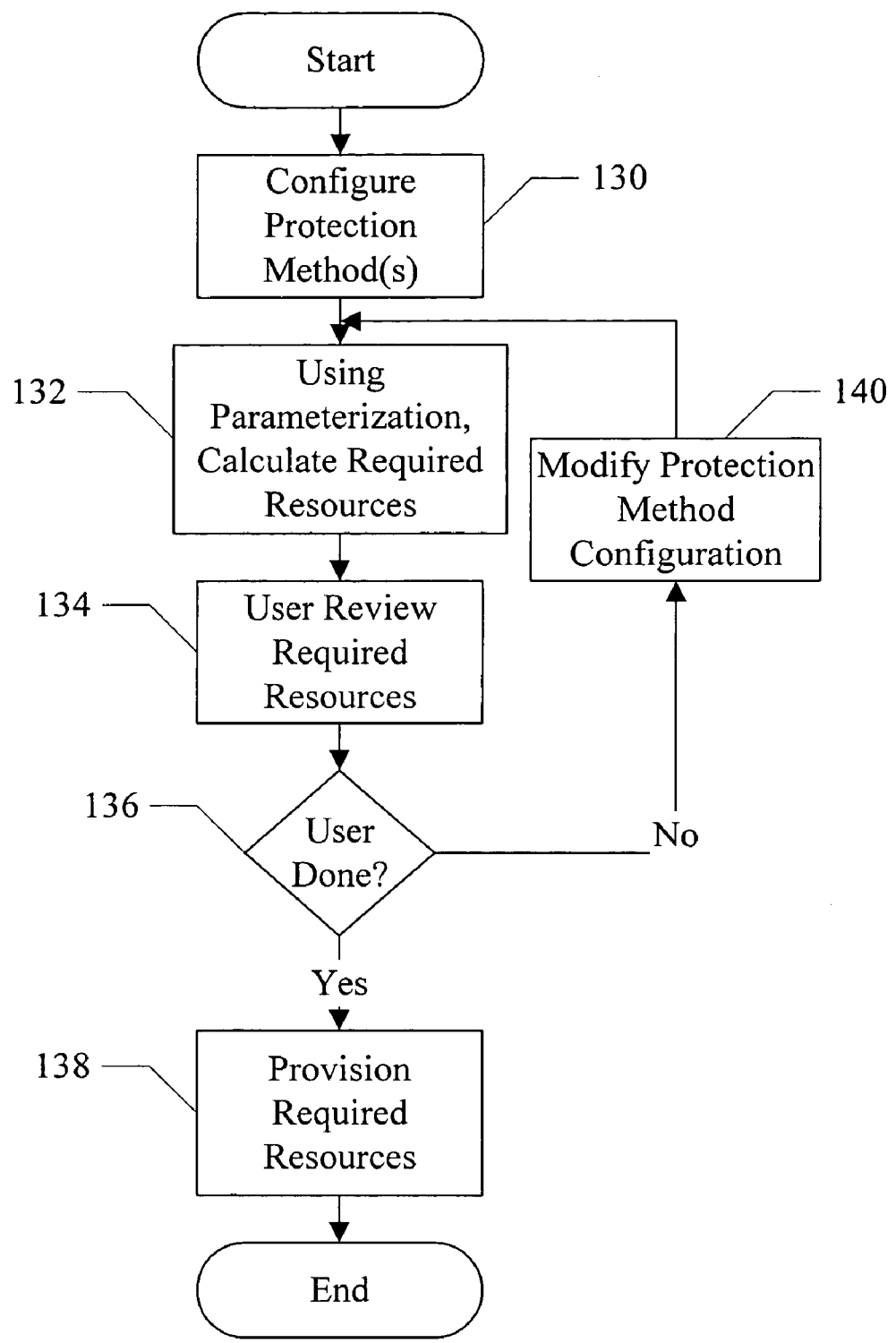
FIG. 14 is a flowchart illustrating one embodiment of using parameterization data to select protection methods and determine resources required for the selected protection methods.

Turning now to FIG. 14, a flowchart is shown illustrating operation of one embodiment of the recovery manager 16 for predicting required resources for a selected protection method or methods. The recovery manager 16 may include instructions which, when executed, implement at least some of the operation shown in FIG. 14. FIG. 14 may make use of the translation, using the parameterization data 20, from protection methods 30 to required resources 38 illustrated in FIG. 3. The functionality shown in FIG. 14 may be used, e.g., to ensure enough resources are allocated to provide for efficient operation of the protection methods and to prevent failure. In other cases, the functionality shown in FIG. 14 may be used to reduce or eliminate over-provisioning of resources to a protection method or methods.

The user may provide input configuring one or more protection methods in the recovery manager 16 (block 130). The protection methods may not actually be deployed in a protection system, but the deployment that is under consideration may be provided to the recovery manager 16. Using the parameterization data 20, the recovery manager 16 may calculate the resources required to implement the protection method(s) (block 132). The functionality of FIG. 6 may, e.g., be used to calculate the required resources. The recovery manager 16 (or other software) may display the required resources to the user, who may review the required resources (block 134). If the user is satisfied with the required resources and wishes to deploy the protection methods (decision block 136, "yes" leg), the required resources may be provisioned (or allocated) to the protection methods (block 138). Either the user may manually provision the resources, or the recovery manager 16 may provision the resources, in various embodiments. The provisioning of required resources may be optional, in some embodiments. On the other hand, if the user is not satisfied with the required resources (e.g. the resources are not available, the resources exceed a desired expense that the user would like to maintain for the protection system, etc.) (decision block 136, "no" leg), the user may modify the protection methods configured in the recovery manager 16 (block 140). Blocks 132 and 134 may be repeated to determine the required resources for the new configuration. The user may iterate with configurations as often as desired to identify a protection system configuration and the corresponding resources.

Using Translation to Determine Protection Methods from Available Resources

Figure 15:
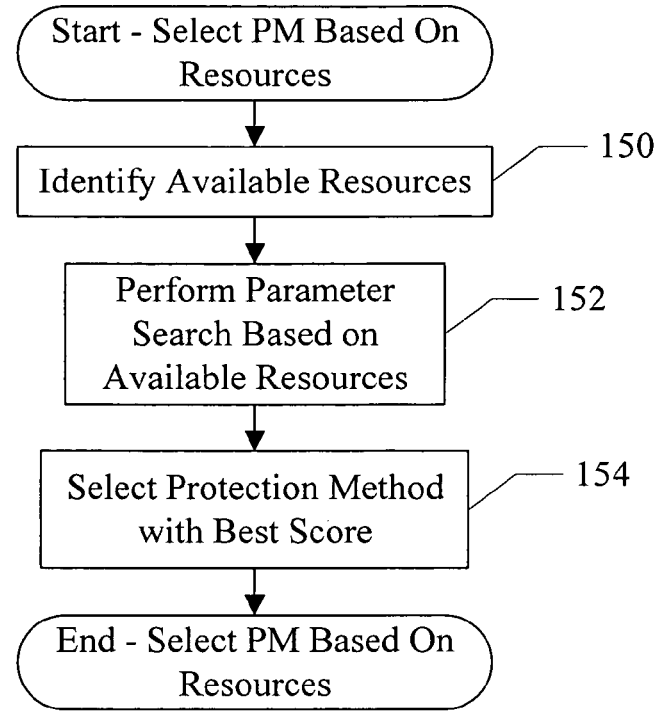
FIG. 15 is a flowchart illustrating one embodiment of selecting a protection method based on available resources.

Turning now to FIG. 15, a flowchart is shown illustrating operation of one embodiment of the recovery manager 16 for selecting a protection method or methods that may be implemented using a set of available resources. The recovery manager 16 may include instructions which, when executed, implement at least some of the operation shown in FIG. 15. FIG. 15 may make use of the translation, using the parameterization data 20, from available resources 36 to protection methods 30 illustrated in FIG. 3.

The user may provide input identifying the available resources (block 150). Alternatively, the recovery manager 16 may use various automatic discovery mechanisms to discover the available resources. In yet other cases, a combination of user input and discovery may be used to assemble an indication of the available resources.

The recovery manager 16 may perform a parameter search in the parameterization data 20 based on the available resources (block 152). For example, the functionality shown in FIG. 5 may be invoked to search the parameterization data 20 with an indication of the available resources as input.

Particularly, a parameterization encoding based on the available resources may be generated and evaluated against the parameterization data. In some embodiments, the recovery manager 16 may present the list of protection methods that may be implemented using the available resources, optionally with the score calculated from the parameterization comparisons. In other embodiments, the recovery manager 16 may select the protection method with the best score (block 154). The best score may indicate, e.g., the protection method that consumes the least of the available resources or that is most likely to be successful using the available resources.

Recovery Manager Triangle

Figure 16:
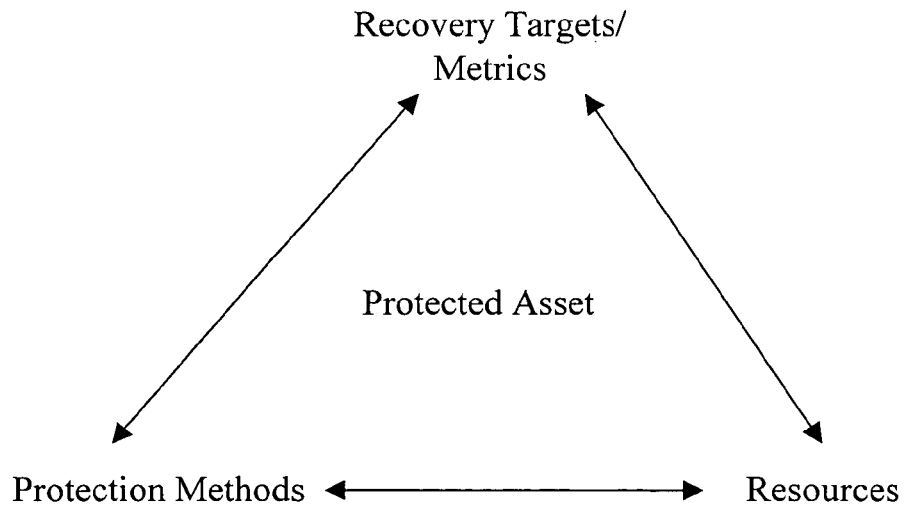
FIG. 16 is a block diagram of one embodiment illustrating three dimensions of a protection system.

As described above, for one embodiment, there are at least three interrelated dimensions to a protection system: the recovery targets (or metrics), the protection methods, and the resources. FIG. 16 illustrates these three dimensions as a triangle around a protected asset. The arrows between the vertices of the triangle represent the interrelationship between the dimensions.

The recovery manager 16, in some embodiments, may expose the above three dimensions to the user and may support user input making changes to a given configuration in any of the three dimensions. The recovery manager 16 may provide the functionality to calculate the effect of the changes in any of the dimensions on the other two dimensions. In this way, a user may be able to efficiently configure a protection 10 system for the protected asset, with an understanding of the trade offs between the protection methods, resources, and recovery targets that is illustrated by the recovery manager triangle.

The recovery manager 16 may or may not implement a user interface for the user to interact with the various dimensions, in various embodiments. Additionally, the recovery manager triangle shown in FIG. 16 may or may not be illustrative of the actual user interface. Any user interface that permits the user to view and interact with the various dimensions may be used. The recovery manager 16 exposes the dimensions and responds to user input making one or more modifications in one of the dimensions by calculating the effect of the modifications on the other dimensions.

Figure 17:
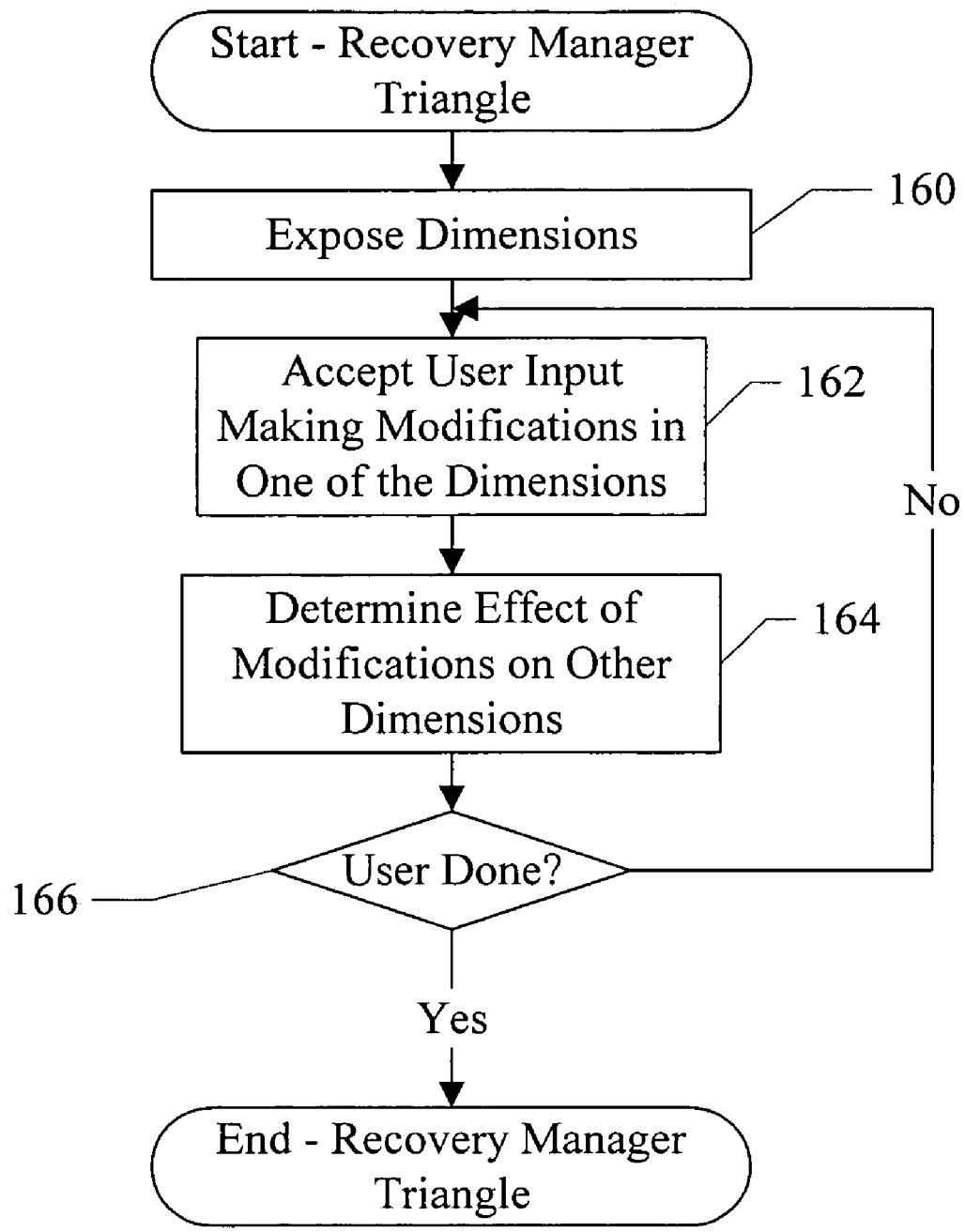
FIG. 17 is a flowchart illustrating operation of one embodiment of the recovery manager 16 exposing the dimensions of FIG. 16 and supporting user interaction with the dimensions.

FIG. 17 is a flowchart illustrating operation of the recovery manager 16 at a high level with regard to the recovery manager triangle and user interaction with the triangle. The recovery manager 16 may include instructions which, when executed, implement the operation shown in FIG. 17.

The recovery manager 16 may expose the dimensions to the user (block 160). The recovery manager 16 may accept user input making modifications in one of the dimensions (block 162). The recovery manager 16 may determine the effect of the modifications on the other dimensions (block 164). The effects may be made visible to the user (e.g. if the user views one of the other dimensions). If the user is not finished, the recovery manager 16 may continue to accept user input and determine the effect of the modifications on the other dimensions (decision block 166, "no" leg, returning to block 162).

Figures 18, 19:
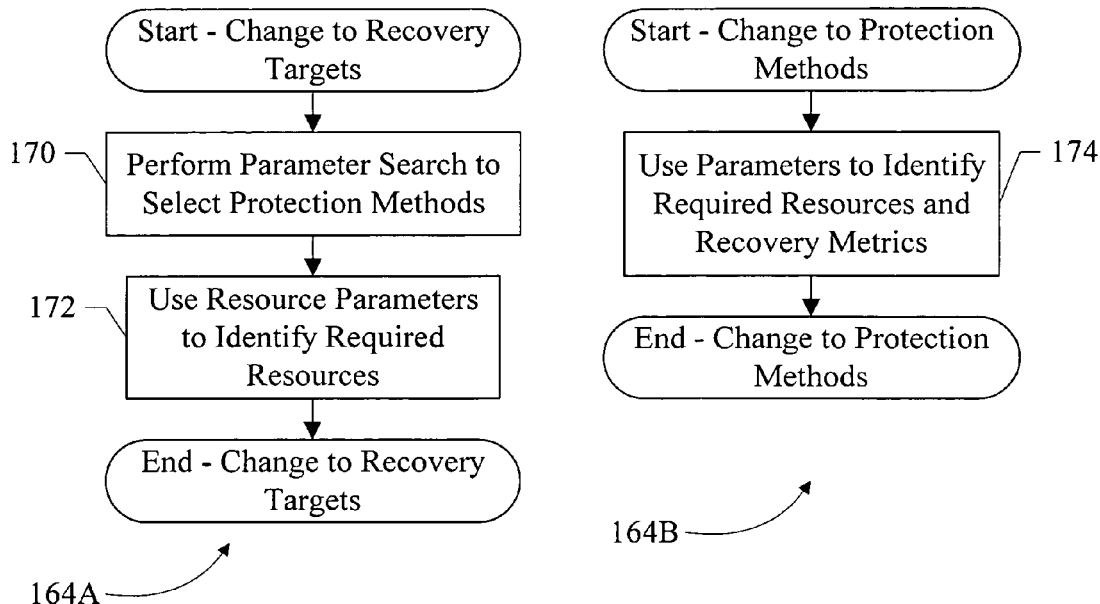
FIG. 18 is a flowchart illustrating one embodiment of a change to recovery targets for the embodiment of FIG. 16.
FIG. 19 is a flowchart illustrating one embodiment of a change to protection methods for the embodiment of FIG. 16.
Figure 20:
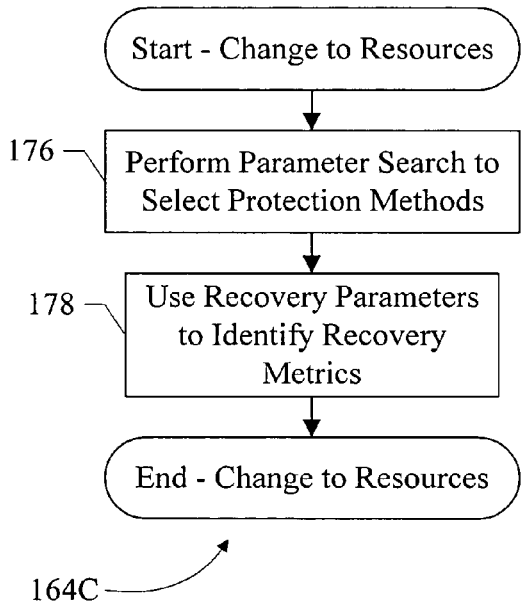
FIG. 20 is a flowchart illustrating one embodiment of a change to resources for the embodiment of FIG. 16.

FIGS. 18, 19, and 20 illustrate portions of one embodiment of determine the effect of modifications on the other dimensions (block 164 in FIG. 17). Thus, FIGS. 18, 19, and 20 are labeled with reference numerals 164A, 164B, and 164C, respectively. Each of FIGS. 18, 19, and 20 illustrates determining the effect for modifications made in a different one of the dimensions. The recovery manager 16 may include instructions which, when executed, implement the operation shown in FIGS. 18, 19, and 20. In general, if the modification is to the parameterized dimension (the protection method dimension, in some embodiments), the effect on the other dimensions may be determined from the parameters of the selected instance or instances in the parameterized dimension. If the modification is to a different dimension than the parameterized dimension, the effect may be determined by first determining the effect on the parameterized dimension (translating from that dimension to the parameterized dimension), then using the parameters from the selected instance or instances of the parameterized dimension to determine the effect on the remaining dimension.

FIG. 18 illustrates determining the effect of modifications to the recovery targets dimension. In this case, the recovery manager 16 may perform a parameter search to select protection methods corresponding to the recovery targets (e.g. invoking the functionality of FIG. 5 with the recovery targets as inputs—block 170). Once the recovery targets have been translated to protection methods, the recovery manager 16 may use the resource parameters of the selected protection method(s) to translate to a set of required resources (e.g. invoking the functionality of FIG. 6 for the selected protection methods—block 172).

FIG. 19 illustrates determining the effect of modifications to the protection method dimension. In this case, the recovery manager 16 may use the resource and recovery target set parameters for the protection methods to translate to a set of required resources and recovery metrics (e.g. invoking the functionality of FIG. 6 for the protection methods—block 174).

FIG. 20 illustrates determining the effect of modifications to the resources dimension. In this case, the recovery manager 16 may perform a parameter search to select protection methods corresponding to the resources (e.g. invoking the functionality of FIG. 5 with the resources as inputs—block 176). Once the resources been translated to protection methods, the recovery manager 16 may use the recovery target set parameters of the selected protection methods to translate to a set of recovery metrics (e.g. invoking the functionality of FIG. 6 for the selected protection methods—block 178).

In other embodiments, the parameterization may be different than discussed above (in which the protection method dimension is parameterized for both the resources dimension and the recovery targets dimension). For example, as long as parameterization exists between at least pairs of the dimensions, translation from one dimension to another may be performed. In some cases, a given translation may take one or more steps through intermediate dimensions, dependent on the parameterizations implemented.

Figure 21:
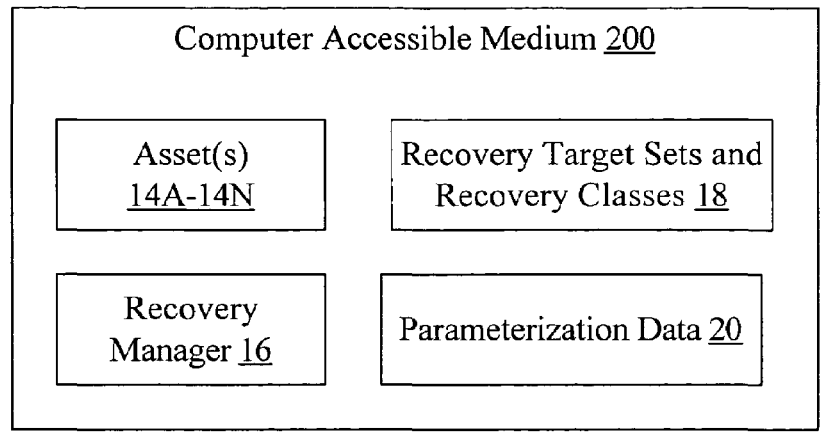
FIG. 21 is a block diagram of one embodiment of a computer accessible medium.

Turning now to FIG. 21, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 200 in FIG. 21 may be encoded with one or more of the assets 14A-14N, the recovery target sets and recovery classes 18, the parameterization data 20, and/or the recovery manager 16. The recovery manager 16 may comprise instructions which, when executed, implement the operation described herein for the recover manager 16. Generally, the computer accessible medium 200 may store any set of instructions which, when executed, implement a portion or all of the flowcharts shown in one or more of FIGS. 5, 6, 10, 11, 12, 14, 15, 17, 18, 19, and 20.

Figure 22:
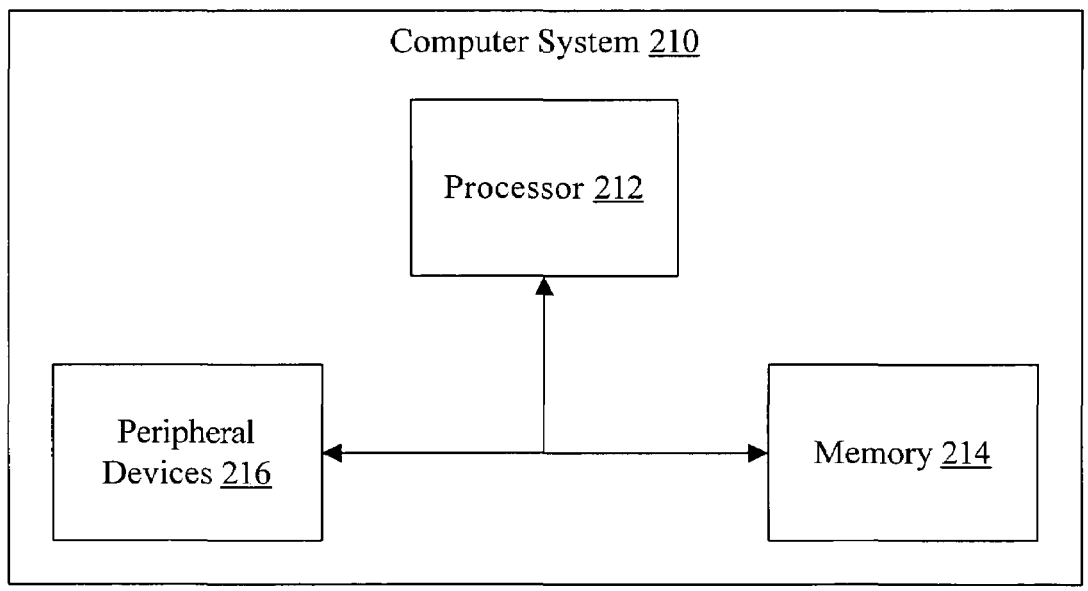
FIG. 22 is a block diagram of one embodiment of a computer system.

FIG. 22 is a block diagram of one embodiment of an exemplary computer system 210. In the embodiment of FIG. 22, the computer system 210 includes a processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to coupled the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use (including the instructions implementing the software described herein), data to be operated upon by the processor 212 during use, etc.

Peripheral devices 216 may represent any sort of hardware devices that may be included in the computer system 210 or coupled thereto (e.g. storage devices, optionally including a computer accessible medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A method comprising:
    exposing at least three dimensions of a protection system to a user, wherein the at least three dimensions are interrelated, and wherein the at least three dimensions comprise a protection methods dimension, a resources dimension, and a recovery targets dimension that specifies recoverability properties of an asset protected by the protection system;
    receiving user input indicating a modification in a first dimension of the at least three dimensions;
    determining an effect of the modification in each other dimension of the at least three dimensions, wherein a parameterized dimension of the at least three dimensions is parameterized for each other one of the at least three dimensions, and wherein, responsive to the modification being in a different dimension from the parameterized dimension, determining the effect of the modification comprises determining the effect in the parameterized dimension and then determining the effect in one or more remaining dimensions of the at least three dimensions excluding the different dimension and the parameterized dimension; and
    displaying the effect of the modification on the other dimensions to the user.

2. The method as recited in claim 1 wherein determining the effect in the one or more remaining dimensions comprises calculating the effect from parameters of the parameterized dimension.

3. The method as recited in claim 1 wherein, if the modification is in the parameterized dimension, determining the effect of the modification comprises calculating the effect from parameters of the parameterized dimension.

4. The method as recited in claim 1 wherein the parameterized dimension is a protection methods dimension.

5. The method as recited in claim 4 wherein another one of the at least three dimensions is a resources dimension.

6. The method as recited in claim 4 wherein another one of the at least three dimensions is a recovery targets dimension.

7. The method as recited in claim 1 further comprising parameterizing one or more of the at least three dimensions for at least one other one of the at least three dimensions.

8. A computer accessible storage medium storing a plurality of instructions comprising instructions which, when executed:
    expose at least three dimensions of a protection system to a user, wherein the at least three dimensions are interrelated, and wherein the at least three dimensions comprise a protection methods dimension, a resources dimension, and a recovery targets dimension that specifies recoverability properties of an asset protected by the protection system;
    receive user input indicating a modification in a first dimension of the at least three dimensions;
    determine an effect of the modification in each other dimension of the at least three dimensions, wherein a parameterized dimension of the at least three dimensions is parameterized for each other one of the at least three dimensions, and wherein, responsive to the modification being in a different dimension from the parameterized dimension, determining the effect of the modification comprises determining the effect in the parameterized dimension and then determining the effect in one or more remaining dimensions of the at least three dimensions excluding the different dimension and the parameterized dimension; and
    display the effect of the modification on the other dimensions to the user.

9. The computer accessible storage medium as recited in claim 8 wherein determining the effect in the one or more remaining dimensions comprises calculating the effect from parameters of the parameterized dimension.

10. The computer accessible storage medium as recited in claim 8 wherein, if the modification is in the parameterized dimension, determining the effect of the modification comprises calculating the effect from parameters of the parameterized dimension.

11. The computer accessible storage medium as recited in claim 8 wherein the parameterized dimension is a protection methods dimension.

12. The computer accessible storage medium as recited in claim 11 wherein another one of the at least three dimensions is a resources dimension.

13. The computer accessible storage medium as recited in claim 11 wherein another one of the at least three dimensions is a recovery targets dimension.

14. The computer accessible storage medium as recited in claim 8 wherein one or more of the at least three dimensions is parameterized for at least one other one of the at least three dimensions.

15. A computer system comprising the computer accessible storage medium as recited in claim 8 and a processor coupled to the computer accessible medium and configured to execute the plurality of instructions.

* * * * *